(12) United States Patent
Albrecht et al.

(10) Patent No.: US 11,287,799 B2
(45) Date of Patent: Mar. 29, 2022

(54) METHOD FOR COORDINATING AND MONITORING OBJECTS

(71) Applicant: Robert Bosch GmbH, Stuttgart (DE)

(72) Inventors: Andreas Albrecht, Esslingen (DE); Keerthana Govindaraj, Leonberg (DE); Volker Henrichs, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 16/549,591

(22) Filed: Aug. 23, 2019

(65) Prior Publication Data

US 2020/0073363 A1 Mar. 5, 2020

(30) Foreign Application Priority Data

Aug. 28, 2018 (DE) .......................... 102018214492.3
Sep. 12, 2018 (DE) .......................... 102018215560.7

(51) Int. Cl.
*G05B 19/4063* (2006.01)
*G05B 19/4097* (2006.01)
(Continued)

(52) U.S. Cl.
CPC ..... *G05B 19/4063* (2013.01); *G05B 19/4097* (2013.01); *G05B 19/4155* (2013.01);
(Continued)

(58) Field of Classification Search
CPC ............... G05D 1/0044; G05D 1/0297; G05D 2201/0216; G05D 1/0027; G05D 1/0291;
(Continued)

(56) References Cited

U.S. PATENT DOCUMENTS

2003/0191583 A1* 10/2003 Uhlmann ......... G08G 1/096716
701/409
2012/0323431 A1* 12/2012 Wong ..................... B66F 9/063
701/25
(Continued)

FOREIGN PATENT DOCUMENTS

| DE | 102015205088 A1 | 9/2016 |
| DE | 102016211129 A1 | 12/2017 |
| EP | 2508956 A1 | 10/2012 |

*Primary Examiner* — Khoi H Tran
*Assistant Examiner* — Tanner L Cullen
(74) *Attorney, Agent, or Firm* — Norton Rose Fulbright US LLP; Gerard Messina

(57) ABSTRACT

A method for coordinating and monitoring objects in a predefined spatial area that includes multiple subareas that are each associated with a respective subarea computing system includes position and movement information of objects in the particular subarea being ascertained by the particular subarea computing system using sensor units. A particular instantaneous surroundings map of the particular subarea is created by the particular subarea computing system using a particular surroundings map of the particular subarea and the position and movement information. The particular instantaneous surroundings maps are transmitted to a shared higher-order computing system which creates an instantaneous surroundings map of the predefined spatial area and, based on the map, coordinates movements of automated mobile objects in the spatial area with ascertainment of movement specifications that are transmitted to the subarea computing systems and from there to the automated mobile objects.

7 Claims, 2 Drawing Sheets

(51) Int. Cl.
*G05B 19/4155* (2006.01)
*G05B 19/418* (2006.01)
*G05D 1/00* (2006.01)
*H04L 29/08* (2006.01)
*H04L 67/12* (2022.01)
*G05D 1/02* (2020.01)

(52) U.S. Cl.
CPC ..... *G05B 19/41895* (2013.01); *G05D 1/0044* (2013.01); *G05D 1/0297* (2013.01); *H04L 67/12* (2013.01)

(58) Field of Classification Search
CPC .... G05D 1/0022; G05D 1/0274; G08G 1/166; G08G 1/165; G08G 1/22; G08G 1/13; G05B 19/41895; G05B 19/4063; G05B 19/4185; G05B 19/4097; G05B 19/4155; H04L 67/12; H04W 4/38; H04W 4/70
See application file for complete search history.

(56) References Cited

U.S. PATENT DOCUMENTS

| | | | |
|---|---|---|---|
| 2012/0323432 A1* | 12/2012 | Wong | G05D 1/0274 701/25 |
| 2014/0025292 A1* | 1/2014 | Stahlin | G08G 1/0129 701/461 |
| 2016/0075023 A1* | 3/2016 | Sisbot | G01S 5/0072 700/255 |
| 2017/0021497 A1* | 1/2017 | Tseng | G05D 1/0236 |
| 2018/0136644 A1 | 5/2018 | Levinson et al. | |
| 2018/0300835 A1* | 10/2018 | Saboo | B25J 9/1661 |
| 2019/0072403 A1* | 3/2019 | Sakai | G01S 13/876 |
| 2019/0342731 A1* | 11/2019 | Krishnamoorthy | B25J 9/1676 |
| 2020/0011675 A1* | 1/2020 | Yu | G01C 21/32 |
| 2020/0042018 A1* | 2/2020 | Chiba | G05D 1/0274 |

* cited by examiner

METHOD FOR COORDINATING AND MONITORING OBJECTS

CROSS-REFERENCE TO RELATED APPLICATIONS

The present application claims priority under 35 U.S.C. § 119 to DE 10 2018 214 492.3 filed in the Federal Republic of Germany on Aug. 28, 2018, and to DE 10 2018 215 560.7 filed in the Federal Republic of Germany on Sep. 12, 2018, the content of each of which are hereby incorporated by reference herein in their entireties.

FIELD OF THE INVENTION

The present invention relates to a method for coordinating and monitoring objects in a predefined spatial area, as well as a system, and a computer program for carrying out the method.

BACKGROUND

Systems or computer systems in industrial manufacturing environments are generally not linked to one another, or at least not flexibly or not arbitrarily. When a network is created, the linkages are generally star-shaped, in that individual production facilities or testing systems are connected to a central computer. In order to obtain information from certain network users or individual systems or individual computers, the information of the individual systems is generally accessed via the central computer.

Security systems for monitoring manufacturing facilities are generally likewise only locally connected to the particular associated facility or production facility.

SUMMARY

Example embodiments of the present invention are directed to a method for coordinating and monitoring objects, as well as a system, and a computer program for carrying out the method.

A method according to the present invention is used for coordinating and monitoring objects in a predefined spatial area, in particular using a system of linked computing systems. The spatial area can in particular be an area, in particular inside or outside of buildings, or one or multiple buildings with or without exterior surfaces, such as an industrial production building or plant premises or the like. In particular production facilities, robots, vehicles, or also persons are considered to be objects. The predefined spatial area encompasses multiple subareas, and in particular the area can be subdivided into these subareas, although it is also advantageous if the subareas partially overlap. A subarea computing system is associated with each of the subareas. Such a subarea computing system can be an individual processing unit or an individual computer, although a system made up of multiple linked processing units is also conceivable.

Using the particular subarea computing system, position and movement information of objects in the particular subarea is now ascertained and in particular continuously updated, using sensor units. Position information of static objects such as stationary production facilities can be ascertained. On the other hand, position and movement information (for example, a speed and a movement direction) of mobile objects such as vehicles and persons can be ascertained. Examples of suitable sensor units are cameras, in particular video cameras and stereo cameras, ultrasonic sensors, microphones, proximity sensors, radar units, time-of-flight cameras, LIDAR units, radio modules, in particular WLAN units and Bluetooth units, inertial sensors, and distance sensors. Thus, all available options for detecting position and movement information of objects in the particular subareas can be used, and are then collected on the subarea computing system.

Using the particular subarea computing system, a particular instantaneous surroundings map of the particular subarea is then created, using a particular surroundings map of the particular subarea and the position and movement information. In particular, a map containing static information is initially considered to be a surroundings map, which can be based on ground plans, building plans, CAD files, and the like, preferably also already including the position of stationary objects such as production facilities. A 3D surroundings map is particularly advantageous. With the above-mentioned position and movement information, based on such a (static) surroundings map it is then possible to create an instantaneous surroundings map containing instantaneous positions of objects and in particular also the movement or movement direction of mobile objects.

The particular instantaneous surroundings maps are transmitted to a shared, higher-order computing system and also preferably abstracted. Such a higher-order computing system can in particular likewise be an individual processing unit or an individual computer, although a system made up of distributed processing units is also conceivable. The abstraction of the instantaneous surroundings maps is understood in particular to mean that a degree of detail of the surroundings maps is reduced. A reduction in the degree of detail can take place, for example, due to a transition from a 3D map, which also contains the three-dimensional object contours, to a 2D map that contains only the rough ground plans and/or outlines of static and/or movable objects. On the topmost level, movable objects can be represented, for example, only as markers, and larger objects can be represented two-dimensionally as polygons.

The instantaneous surroundings maps can be transmitted directly to the higher-order computing system, although one or multiple levels with computing systems situated in between are also conceivable, using which the instantaneous surroundings maps on the way from the subarea computing systems to the higher-order computing system are combined and preferably abstracted in intermediate stages. In particular fairly large areas can be detected more effectively in this way, since certain hierarchy levels are formed. However, for smaller areas an intermediate level or a direct transmission from the subarea computing systems to the higher-order computing system can also be sufficient.

Using the higher-order computing system, an instantaneous surroundings map of the predefined area is then created, and on this basis, movements of automated mobile objects in the area are coordinated, with ascertainment of movement specifications. The individual instantaneous surroundings maps are combined, in particular on an abstracted level, so that an overview of all objects in the area, for example a production building, is present on the higher-order computing system. A particularly simple and rapid coordination of the automated mobile objects is thus possible, and movement specifications can be made, such as predefining routes. Automated mobile objects are understood in particular to mean, for example, (driverless) transport vehicles that are movable in an automated manner. An abstracted surroundings map, i.e., a surroundings map having a lesser degree of detail, is generally sufficient for such a coordination, resulting in more efficient processing. Thus, for ascertaining a travel route it is not necessary to know, for example, the particular instantaneous position of a robot arm of some other stationary production facility. Rather, it is relevant, for example, at which positions other mobile objects are present, and/or which movement direction they have, in order to avoid collisions. In addition, it is advantageous when a prioritization of objects is made so that they have priority over other objects.

Static and/or nonautomated mobile objects, for example persons, are preferably regarded as obstacles when ascertaining the movement specifications for the automated mobile objects. This is particularly advantageous for obstacle objects which themselves do not have communication options such as radio modules, and instead can be only passively detected. This applies in particular to persons, for example.

The movement specifications are then transmitted to the subarea computing systems, optionally via the computing systems situated in between, and from there to the automated mobile objects. The instantaneous surroundings maps are present on the subarea computing systems with a higher or high degree of detail, so that this can result in particularly accurate control of the mobile objects.

Based on an instantaneous surroundings map of the predefined area that is created using the higher-order computing system, an instantaneous surroundings map of a subarea can preferably be created and transmitted to the appropriate subarea computing system. Thus, objects moving from one subarea into another subarea, for example, can be taken into account. The surroundings maps present on the lowermost level can be updated in this way.

The present invention is described below using a specific example. Thus, a distributed network, for example an edge server network, with various levels is provided that creates and manages a preferably seamless 3D surroundings map of a plant or production building based on a priori data, i.e., data that are already present or stored (for example, 3D CAD data, building plans, etc.), and based on data of sensor units. The production building is subdivided into various adjoining or also partially overlapping subareas in the sense of monitoring cells, which are equipped with sensor units that are also used in particular as monitoring sensors (stereo cameras, for example), so that continuous monitoring of the individual subareas, and thus of the entire area, is possible.

Combining and evaluating the 3D data as well as traffic and collision monitoring of the objects in the individual subareas are carried out on the lowest level by the responsible subarea computing systems, for example edge servers. These subarea computing systems each creates a detailed 3D surroundings map of their own subarea, which can be continuously updated based on the data of the sensor units. Thus, all movable or immovable objects, including their instantaneous movement states, are known in the subarea computing system.

The detailed 3D surroundings maps of the subareas of the lowermost level are passed upwardly in stages, corresponding to the network hierarchy, and on each level are in particular abstracted slightly further, thus achieving an information reduction. On the topmost level, all information is combined in a higher-order computing system, a "super edge server," so to speak, but with a relatively high degree of abstraction. This higher-order computing system now includes a rough surroundings map of the entire area, such as a production building, which likewise can be continuously updated.

Using this surroundings map, the higher-order computing system can plan and suitably coordinate the entire traffic flow of all automated mobile objects (in particular autonomous robots or vehicles) in the area. Attention is paid in particular to optimizing the traffic flow and avoiding collisions. In particular, nonlinked objects in the traffic (i.e., persons or employees) can be protected from accidents.

Path planning or general movement specifications for the individual automated mobile objects are now passed downwardly in the network hierarchy in a reverse manner. The higher-order computing system and all computing systems on intermediate levels can thus further distribute certain information between the other computing systems and optionally also objects. Specific monitoring and local coordination of the automated mobile objects is ultimately taken over by the subarea computing systems on the lowermost level, which control the automated objects on the lowermost level. The automated mobile objects themselves thus require only very simple, limited sensor equipment and navigation functionality, which serve the mobile objects, for example, only as an emergency braking or emergency evasion function, and for detailed navigation at close range (for example, during docking at the station of a line in order to distribute products, semifinished products, or raw materials).

An improvement in the performance of the overall production building (or plant) is thus achieved by traffic flow optimization (in particular when a plurality of linked autonomous transport systems is used in a mixed scenario with noncommunicating objects). In addition, an increase in the safety of all objects, in particular the nonlinked human objects, is achieved by implementing safety functions (for example, collision avoidance for autonomous transport systems, warning of persons, and assistance of safety functions of machine monitoring by recognition of objects that intrude into the safety zone of a facility). In addition, savings in sensor and computer equipment for the automated mobile objects are possible.

A system according to an example embodiment of the present invention including multiple computing systems is configured for carrying out a method according to the present invention, in particular by programming.

In addition, implementing the method in the form of a computer program is advantageous, since this involves particularly low costs, in particular when an operating control unit is also utilized for further tasks, and therefore is present anyway. Suitable data media for providing the computer program are in particular magnetic, optical, and electrical memories such as hard disks, flash memories, EEPROMs, DVDs, and others. In addition, downloading a program via computer networks (Internet, Intranet, etc.) is possible.

Further advantages and embodiments of the present invention result from the description and the appended drawings.

The present invention is schematically illustrated in the drawings based on an example embodiment, and described below with reference to the drawings.

DETAILED DESCRIPTION

System 100, in the sense of a network or linked computing systems, is made up of multiple levels and multiple computing systems, in particular so-called edge servers, which can be distributed and linked over the various network levels. There is a topmost level with a higher-order computing system 130 (in particular a so-called super edge server), which itself can also be a distributed system. In the example shown, this higher-order computing system 130 combines the information of all other computing systems 120 on the lower-order intermediate levels and distributes them as needed to the relevant computing systems.

The lowermost network level is made up of multiple subarea computing systems 110, and is linked to computing systems 120 of higher-level intermediate levels. The lowermost network level is characterized in that it connects the sensor units distributed in area 200, which in the present case is a production building, for recognizing and tracking all objects situated in the production building, to the overall network or to the system. The architecture and the number of intermediate levels of the system depend on the size of area 200 and the number of computing systems to be connected. In addition, the mobile objects themselves can be a temporary or permanent part of the overall network or system. It is assumed in particular here that all (linked) objects and computing systems are uniquely identifiable (for example, via a unique IP or MAC address).

Figure 1:
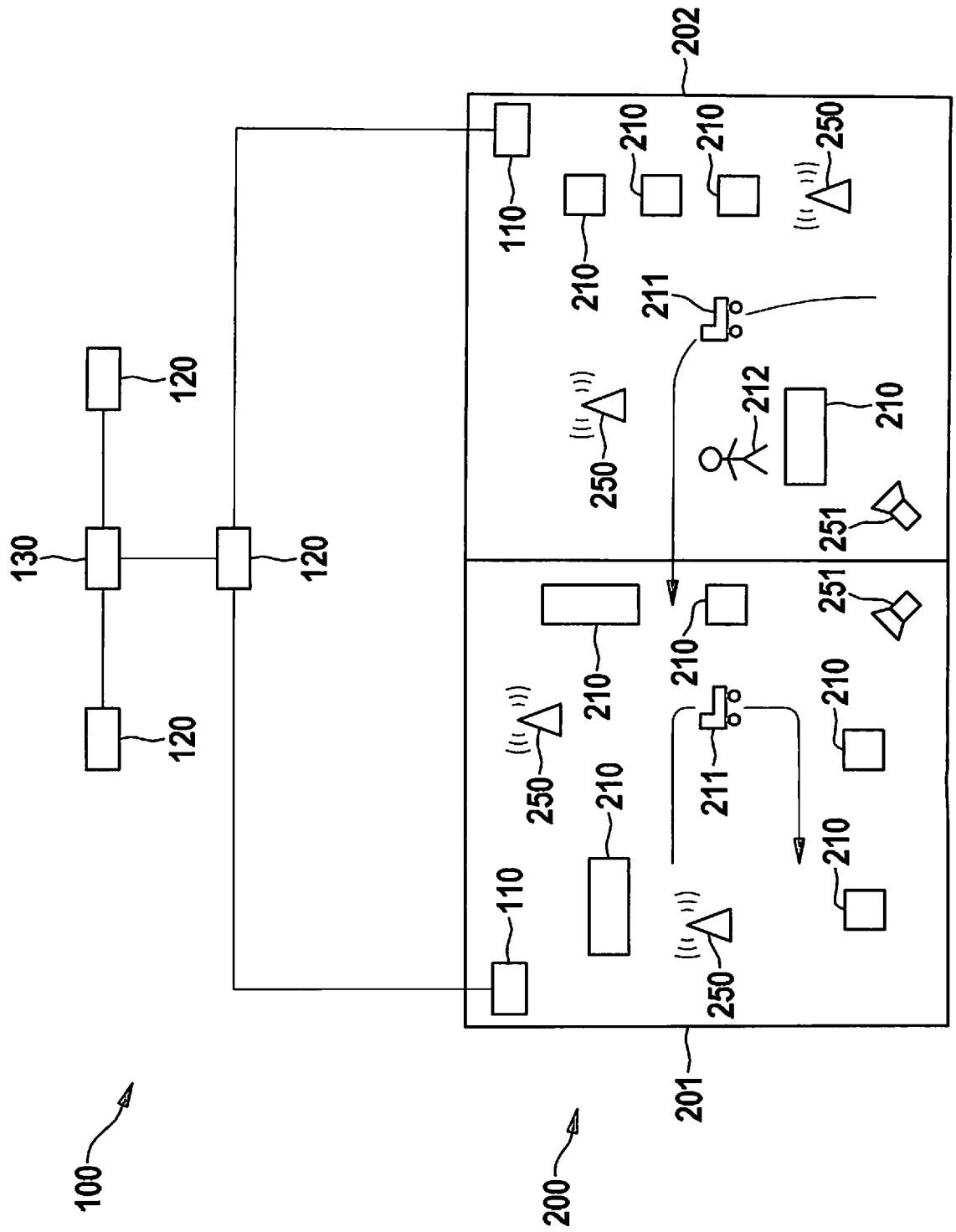
FIG. 1 schematically illustrates a system that includes numerous computing systems with which a method can be carried out in a spatial area, according to an example embodiment of the present invention.

Moreover, it is advantageously assumed that the system includes a global surroundings map (in particular in 3D) of the production building and its subdivision into subareas, which are designed here as monitoring cells. FIG. 1 shows two subareas 201 and 202 by way of example, and the associated (static) maps are denoted by reference symbols $K_1$ and $K_2$ in FIG. 2. In particular the positions of the individual subarea computing systems and the positions and orientations of the sensor units are also present in these maps. After the surroundings map of area 200 has been created, the positions and optionally the orientations of all sensor units (cameras, for example) are known.

A uniquely identifiable subarea computing system is responsible for each subarea. Provided that system 100 does not obtain a new surroundings map, it can assume that the previous surroundings map is valid. FIG. 1 shows several radio modules 250 and several cameras 251 by way of example as sensor units in area 200 or subareas 201, 202, which detect position and movement information of the objects in the particular subarea, as denoted by reference symbols $I_1$ and $I_2$ in FIG. 2. The objects themselves are denoted by reference numerals 210, 211, and 212 in FIG. 1, where reference numeral 210 denotes stationary or static objects, reference numeral 211 denotes automated mobile objects, for which a planned route is depicted, and reference numeral 212 denotes persons as objects.

Figure 2:
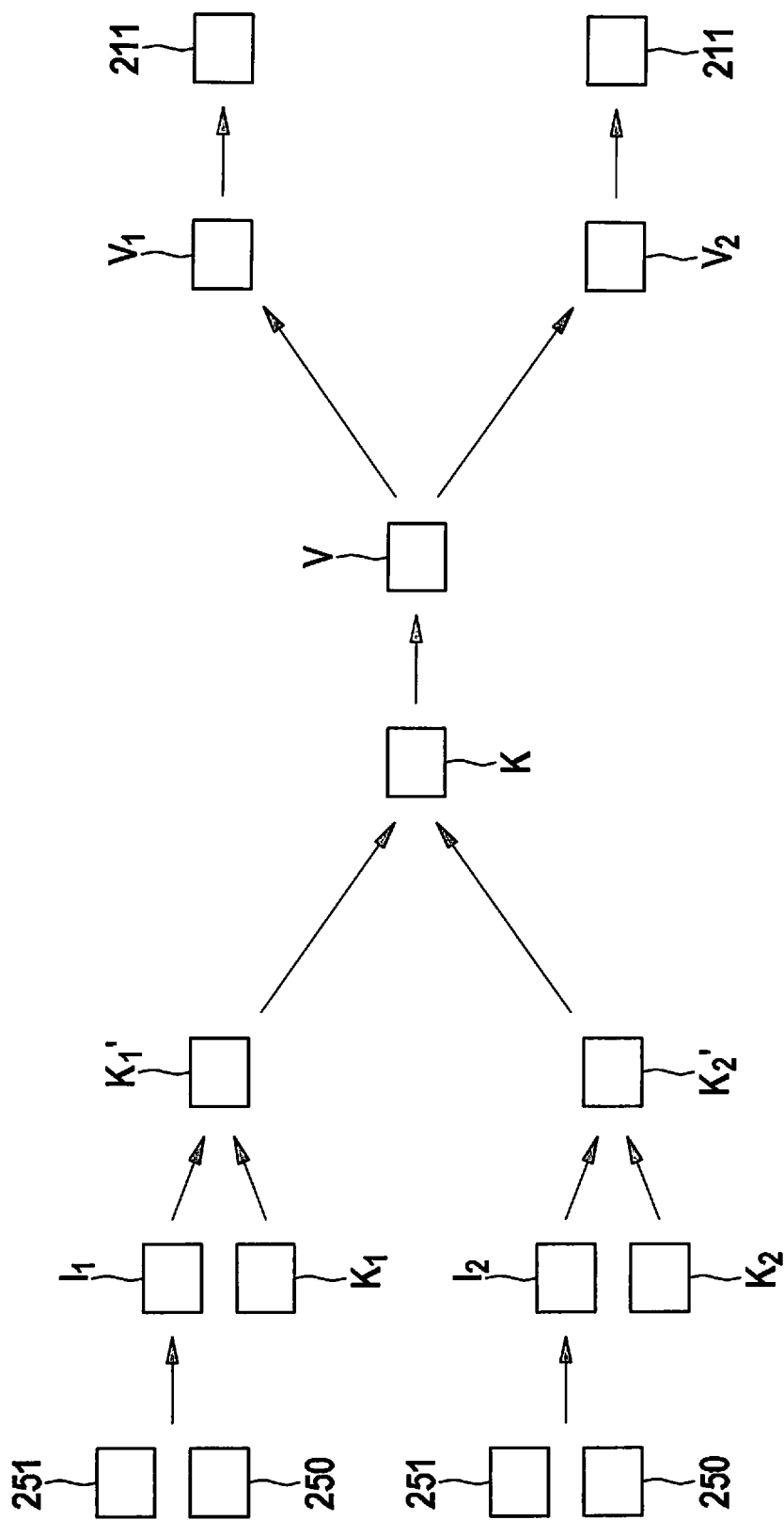
FIG. 2 schematically illustrates a sequence of a method that can be carried out on a system as illustrated in FIG. 1, according to an example embodiment of the present invention.

The setup and the management of the temporally variable, adaptive (instantaneous) surroundings map of area 200, denoted by reference symbol K in FIG. 2, take place distributed over various levels in system 100. Subarea computing systems 110 on the respective lowest network levels initially include only a detailed surroundings map of their own local subarea, i.e., subarea 201 or subarea 202 according to FIG. 1, for which they themselves are responsible. These surroundings maps are denoted by reference symbols $K_1$ and $K_2$ in FIG. 2. By use of position and movement information $I_1$, $I_2$, these surroundings maps become instantaneous surroundings maps $K'_1$ and $K'_2$.

There can be higher-order surroundings maps having less detail or a higher abstraction on an intermediate level in system 100. An abstraction level of the particular surroundings maps corresponds in particular to the particular hierarchy stage of the intermediate level of the responsible computing system in system 100. The surroundings maps on the lowermost level are available with maximum detail. Higher-order surroundings map K of the entire area is set up and managed in the higher-order computing system (i.e., in particular the so-called super edge server) on the topmost network level in a coarse granularity or on a high abstraction level.

The surroundings map of the entire area is initially known only there. However, if necessary, the higher-order computing system can also further distribute these surroundings maps (or certain information therein) to other lower-order computing systems (in intermediate levels as well as on the lowermost level). Higher-order computing system 130 can also query and further distribute detailed surroundings maps (or certain information therein) of subareas of lower-order computing systems in a targeted manner (for example, when information of an adjacent subarea is queried from a monitoring cell or a subarea), or can optionally process this information itself.

Area 200 is subdivided into subareas that ideally can adjoin one another seamlessly or also overlap one another. As mentioned, FIG. 1 shows two subareas 201, 202 by way of example. The shape, arrangement, and size of the subareas can be arbitrary. Each subarea computing system is responsible for a certain subarea, and links, fuses, and compresses the information of all sensor units that monitor the same subarea or are present there, and utilizes this information for creating and updating its detailed local surroundings map of the subarea.

Based on the surroundings map of entire area 200 that is ultimately formed, i.e., a final overall map, higher-order computing system 130 is also able to identify unmonitored areas or gaps in the monitoring system and display these to an operator, for example.

Higher-order computing system 130 thus takes over in particular the overall coordination (prioritization, path planning, etc.) for all automated mobile objects that are incorporated into the network, i.e., movement specifications V for these objects are made, as indicated in FIG. 2. Nonlinked mobile objects (i.e., in particular persons) are regarded as movable (or dynamic) disturbance variables or obstacles in order to avoid hazard situations such as collisions.

For the objects in the particular area, a distinction is made in particular between the following categories:
Stationary objects (for example, machines, facilities, parts of the building structure, pallets, and the like), and in turn a distinction being made between communication-capable stationary objects (for example, certain machines and facilities that are to be approached by mobile objects), which themselves have a communication link to the network, i.e., in particular to the particular computing system of the subarea, and which therefore are network users themselves, and noncommunication-capable stationary objects (for example, parts of the building structure, obstacles, and the like) that have no network connection.
Movable or mobile objects, and in turn a distinction being made between communication-capable movable objects (for example, autonomous transport systems, workpiece carrier systems with RFID tags, and the like), which themselves have a communication link to the network, i.e., in particular to the computing system of the subarea, and which therefore are network users themselves, and noncommunication-capable movable objects (a person, for example) that have no network connection. However, these can in particular be identified, observed, and taken into account in the system as interfering factors or obstacles.

For example, the following tasks can be implemented using the seamless 3D surroundings map of the area and using the position and movement information of the objects:

Global route planning (with traffic rules and prioritization), in particular taking into account numerous autonomous nonhuman objects (mobile robots) in the sense of traffic participants, in particular with application of predefined traffic rules (right-of-way rules, for example), prioritization of the traffic participants, recognition of travelable, collision-free paths (for example, taking into account the size of the traffic participant, including its load), and searching for the optimal route, taking the particular situation into account.

Optimization of the traffic flow in the area, i.e., in particular in the production building, with optimization of the routes of the communication-capable mobile objects in order to minimize the resources used (for example, minimizing the distances traveled or the travel times).

Forecasting of potential collisions based on the movement information of the objects, with active collision avoidance, for example by replanning the route or by targeted stopping and active waiting by individual objects, and warning the other objects so that they locally change their path or route or come to a stop.

Utilization of the location and movement data of the objects situated in the area to assist with further safety functions of machines and facilities (for example, recognizing objects and in particular persons that, for example, enter the safety zone of a robot). Using the higher-order computing system, the facility to be monitored can be warned in advance that an object will soon intrude into its monitoring range. Using the information of the higher-order computing system, it can be checked whether an object has once again departed the monitoring range of a facility in a certain direction, from which, for example, an instruction for reapproaching the facility from the safe state is derivable. The higher-order computing system can assist in identifying an object that intrudes into the monitoring range of a facility.

Utilization of redundancies in the monitoring network in the event of failure of individual sensor units in the higher-order network or in the mobile objects.

The overall coordination of all mobile objects takes place on the topmost network level, which in particular encompasses prioritization and overall route planning. The higher-order computing system knows the position and the motion state of all objects (including the obstacles), and all planned paths and routes of the automated mobile objects in the area.

By feedback of the real-time data, the higher-order computing system can continuously update the 3D surroundings map and the overall route planning, and change or adapt the movement specifications or movement planning of the automated mobile objects according to the situation. In FIG. 2 this is indicated by movement specifications $V_1$ and $V_2$, which are provided for the individual subareas or for the corresponding computing systems. In this way, for example the traffic flow can be optimized, and foreseeable obstructions of the objects with one another can be avoided. The overall route planning is subsequently broken down to the lowermost level of the individual subareas and distributed to the particular responsible subarea computing systems.

This lowermost level now additionally takes on a safety function in the form of collision monitoring and avoidance. Since the sensor data are also evaluated on the lowermost level, all necessary information for this purpose is available in maximum resolution and bandwidth. The subarea computing systems on the lowermost levels can thus now respond in a targeted manner to the automated mobile objects in their subarea, and change their path and speed or influence same according to the situation. Thus, for example, an object having low priority can be stopped in order to let another object having higher priority pass through. In addition, a reduction in the speed or a change in the path or route in the form of an evasive maneuver or bypassing an obstacle are possible responses to a recognized collision risk.

The automated mobile objects retain detailed navigation, including emergency braking or emergency evasion functions, which, for example, respond when the higher-order computing system, for example, fails or is no longer sufficient for navigating the mobile object. In such situations, the local navigation system on the mobile objects comes into play. For this purpose, sensors or sensor units and safety functions are likewise preferably provided on the mobile objects themselves. However, these advantageously have only a short range, and therefore are preferably used as a backup or as an emergency braking or emergency evasion function or for detailed navigation at close range (for example, tracking the correct docking position at the station of a line).

In contrast to the global safety functions, which via the network can rely on the movement information of all movable objects in their particular subarea, in the adjacent subareas, or also in the overall system, and which are controlled essentially by the computing systems on the lowermost level, i.e., in the subareas, the local safety functions of the automated mobile objects, which run only locally on the processing units of the automated mobile objects, are able to monitor only a small subarea around the automated mobile object. If these local safety functions obtain no additional information from the higher-order network, they are meaningfully operable only at a lower, safer speed. By utilizing the movement information of all movable objects in the particular subareas or in the higher-order system, the automated mobile objects can move at much higher speeds using the global safety functions, since possible collisions can thus be recognized much sooner and avoided.

Planning of the global route encompasses not only the path coordinates, but also the subareas to be traveled along the path and the particular responsible subarea computing systems or their linkage with one another. When the higher-order computing system has planned a route, it distributes this plan (including the prioritization and optionally a time component) not only to the relevant mobile objects, but also to the subarea computing systems along the route to be traveled. The local subareas can thus temporally categorize (rank) the various movable objects that come into their area of influence, and can thus optimize the collision monitoring and the local influencing of movements.

For nonlinked objects, the higher-order computing system on the higher-order level knows a maximum position and movement direction, in particular an instantaneous speed vector (a 3D pose can also be available on the local level). This information can be continuously updated using the data of the sensor units from the subareas of the lower levels. With this information, a temporary path can be predicted for a short time period. With this information, it is possible that collision situations will not even occur at all, in that the automated mobile objects (a transport assistant, for example) are instructed to stop, travel more slowly, yield, or take a completely different path.

Another option for protecting nonlinked objects from possible hazards is, for example, to warn them acoustically or optically of the imminent or approaching danger.

What is claimed is:

1. A method for a predefined spatial area that includes a plurality of subareas that each is associated with a respective subarea computing system, the method comprising:
   for each of the subareas:
      the respective subarea computing system of the respective subarea ascertaining position and movement information of objects in the respective subarea using a respective sensor unit of the respective subarea;
      the respective subarea computing system creating a respective instantaneous surroundings map of the respective subarea using a respective base surroundings map of the respective subarea and the ascertained position and movement information; and
      transmitting the respective instantaneous surroundings maps to a shared higher-order computing system shared by the subareas;
   the higher-order computing system creating an instantaneous surroundings map of the predefined spatial area; and
   based on the instantaneous surroundings map of the predefined spatial area, the higher-order computing system coordinating movements of automated mobile objects of the objects in the predefined spatial area using movement specifications that are transmitted to the subarea computing systems, and from the subarea computing systems to the automated mobile objects;
   wherein the transmitting of the respective instantaneous surroundings maps of the respective subareas includes one or more intermediate levels of computing system combining and abstracting the respective instantaneous surroundings maps of the respective subareas and transmitting a result of the combining and abstracting to the higher-order computing system.

2. The method of claim 1, wherein position information of static objects of the objects and position and movement information of the mobile objects in the respective subareas are ascertained by the respective subarea computing system using the sensor units.

3. The method of claim 1, further comprising ascertaining the movement specifications for the automated mobile objects taking into account static ones of the objects or non-automated mobile ones of the mobile objects as obstacles or as dynamic disturbance variables.

4. The method of claim 1, further comprising the subarea computing systems monitoring movement of the automated mobile objects.

5. The method of claim 1, wherein the sensor units include a camera, an ultrasonic sensor, a microphone, a proximity sensor, a radar, a time-of-flight camera, a LIDAR sensor, a radio module, a WLAN unit, a Bluetooth unit, an inertial sensor, or a distance sensor.

6. A system comprising:
   a respective subarea computing system for each of a plurality of subareas of a predefined spatial area; and
   a shared higher-order computing system shared by the subareas;
   wherein:
      the respective subarea computing system of the respective subarea is configured to:
         ascertain position and movement information of objects in the respective subarea using a respective sensor unit of the respective subarea, the position and movement information including a speed of and movement direction of mobile objects of the objects in the respective subarea, the respective subarea computing system being separate from the mobile objects in the respective subarea;
         create a respective instantaneous surroundings map of the respective subarea using a respective base surroundings map of the respective subarea and the ascertained position and movement information, the respective instantaneous surroundings map including the movement direction of the mobile objects; and
         transmit the respective instantaneous surroundings maps to the shared higher-order computing system shared by the subareas; and
      the higher-order computing system is configured to:
         create an instantaneous surroundings map of the predefined spatial area; and
         based on the instantaneous surroundings map of the predefined spatial area, coordinate movements of automated mobile objects of the objects in the predefined spatial area using movement specifications that are transmitted to the subarea computing systems, and from the subarea computing systems to the automated mobile objects;
      wherein the transmission of the respective instantaneous surroundings maps of the respective subareas includes one or more intermediate levels of computing system combining and abstracting the respective instantaneous surroundings maps of the respective subareas and transmitting a result of the combining and abstracting to the higher-order computing system.

7. At least one non-transitory computer-readable medium on which are stored instructions that are executable by a system that includes a respective subarea computing system for each of a plurality of subareas of a predefined spatial area and a shared higher-order computing system shared by the subareas, and which instructions, when executed by the system, cause the system to perform a method, the method comprising:
   for each of the subareas:
      the respective subarea computing system of the respective subarea ascertaining position and movement information of objects in the respective subarea using a respective sensor unit of the respective subarea, the position and movement information including a speed of and movement direction of mobile objects of the objects in the respective subarea, the respective subarea computing system being separate from the mobile objects in the respective subarea;
      the respective subarea computing system creating a respective instantaneous surroundings map of the respective subarea using a respective base surroundings map of the respective subarea and the ascertained position and movement information, the respective instantaneous surroundings map including the movement direction of the mobile objects; and transmitting the respective instantaneous surroundings maps to a shared higher-order computing system shared by the subareas;

the higher-order computing system creating an instantaneous surroundings map of the predefined spatial area; and based on the instantaneous surroundings map of the predefined spatial area, the higher-order computing system coordinating movements of automated mobile objects of the objects in the predefined spatial area using movement specifications that are transmitted to the subarea computing systems, and from the subarea computing systems to the automated mobile objects;

wherein the transmitting of the respective instantaneous surroundings maps of the respective subareas includes one or more intermediate levels of computing system combining and abstracting the respective instantaneous surroundings maps of the respective subareas and transmitting a result of the combining and abstracting to the higher-order computing system.

* * * * *